Patented May 27, 1930

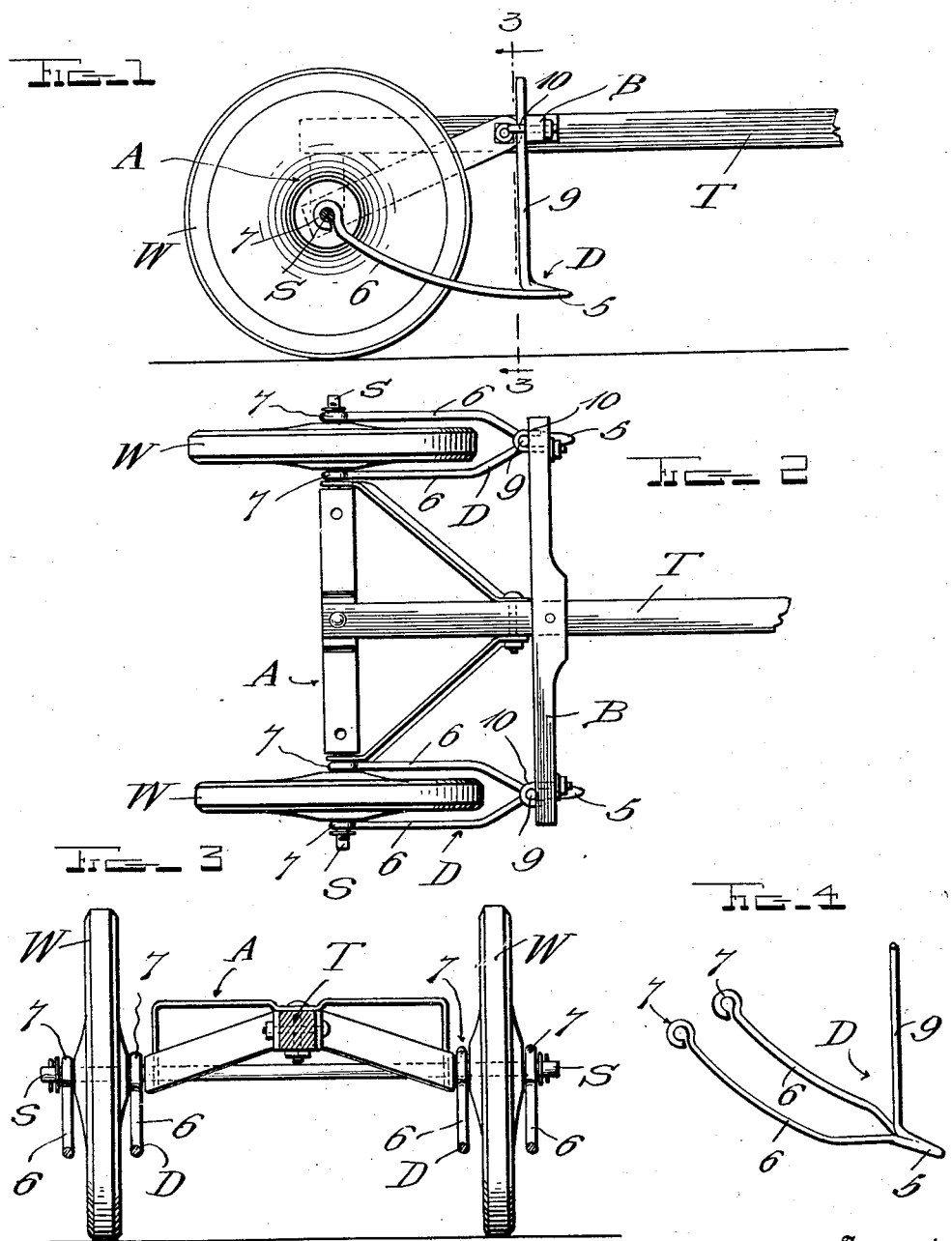

1,760,179

UNITED STATES PATENT OFFICE

BOTSFORD S. SMITH, OF FORT FAIRFIELD, MAINE

VINE PROTECTOR

Application filed March 18, 1929. Serial No. 347,968.

The invention relates to a new and improved means for use upon vine spraying machines and the like for the purpose of deflecting the vines laterally out of the paths of the ground wheels of the machine, thereby preventing said wheels from crushing portions of the vines.

It is the object of the invention to provide an exceptionally simple and inexpensive, yet an efficient and reliable device for the purpose set forth.

With the foregoing in view, the invention resides in the novel subject matter hereinafter described and claimed, description being accomplished by reference to the accompanying drawing.

Fig. 1 is a side elevation of a portion of a vine spraying machine embodying the invention.

Fig. 2 is a top plan view of the parts shown in Fig. 1.

Fig. 3 is a vertical transverse sectional view on line 3—3 of Fig. 1.

Fig. 4 is a perspective view of one of the vine deflectors.

In the drawing above briefly described, a portion of a vine spraying machine is shown embodying an axle structure A having spindles S for wheels W, a tongue T projecting forwardly from said axle structure and a transverse bar B secured to said tongue in front of the wheels and elevated above the ground level. At each side of the machine, one of the improved vine deflectors D has been illustrated, but in view of the fact that they are of identical construction, only one will be described in detail.

The deflector D embodies a forwardly projecting nose 5, two rearwardly projecting arms 6 having eyes 7 at their rear ends, an upwardly projecting arm 9 and a clamp or the like 10 for securing this arm 9 to an end of the bar B. The arms 6 straddle the wheel W and their eyes 7 surround the spindle S. The three arms 6—9 are integrally joined to the rear end of the nose 5 and preferably said three arms and said nose are all constructed from three lengths of metal rod having portions welded together and shaped to provide said nose.

It will be seen from the foregoing that the invention is of exceptionally simple and inexpensive nature, yet that it will be efficient and desirable for laterally deflecting the vines so that the wheels W will not run upon and crush them. Any desired vertical adjustment may be effected by first loosening the clamp 10, sliding the arm 9 upwardly or downwardly as required and causing correspondingly swinging of the arms 6, and then again tightening said clamp. When making such adjustments, the angular relation between the arms 6 and the arm 9 must vary somewhat, but said arm is sufficiently resilient to spring to the required extent.

I claim:—

A vine deflecting attachment for a wheeled implement, comprising three metal rods, two of which are disposed horizontally to straddle a wheel while the third rod is vertically disposed for attachment to a frame part, the front ends of the horizontal rods being bent toward each other and extended forwardly and the lower end of the vertical rod being bent forwardly, the three forwardly extending rod ends being integrally secured to each other to provide an elongated vine separating nose, the rear ends of said horizontal rods being provided with eyes to surround a wheel-carrying spindle.

In testimony whereof I have hereunto affixed my signature.

BOTSFORD S. SMITH.